(12) United States Patent
Nuno et al.

(10) Patent No.: US 6,385,014 B1
(45) Date of Patent: *May 7, 2002

(54) WIRELESS DISK DRIVE SUSPENSION WITH OPTIMIZED MECHANICAL AND ELECTRICAL PROPERTIES

(75) Inventors: Gustavo Nuno; Robert Summers, both of Temecula, CA (US)

(73) Assignee: Magnecomp Corp., Temecula, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/865,984

(22) Filed: May 25, 2001

Related U.S. Application Data

(63) Continuation of application No. 09/436,051, filed on Nov. 8, 1999, now Pat. No. 6,295,183.
(60) Provisional application No. 60/152,145, filed on Aug. 31, 1999.

(51) Int. Cl.$^7$ .................................................. G11B 5/48
(52) U.S. Cl. ..................................... 360/246; 360/245.9
(58) Field of Search ............................... 360/245.9, 246

(56) References Cited

U.S. PATENT DOCUMENTS

| | | | | |
|---|---|---|---|---|
| 5,712,749 A | * | 1/1998 | Gustafson | .................... 360/104 |
| 5,812,344 A | * | 9/1998 | Balakrishman | ............. 360/104 |

* cited by examiner

Primary Examiner—Robert S. Tupper
(74) Attorney, Agent, or Firm—Louis J. Bachand

(57) ABSTRACT

Excessive capacitive coupling in a wireless disk drive suspension having minimum dielectric film thickness for better mechanical properties is reduced by removing a portion of the wireless conductor immediately opposite the suspension conductors only to obtain reduced capacitive coupling and thus better electrical properties without sacrifice of mechanical properties.

11 Claims, 3 Drawing Sheets

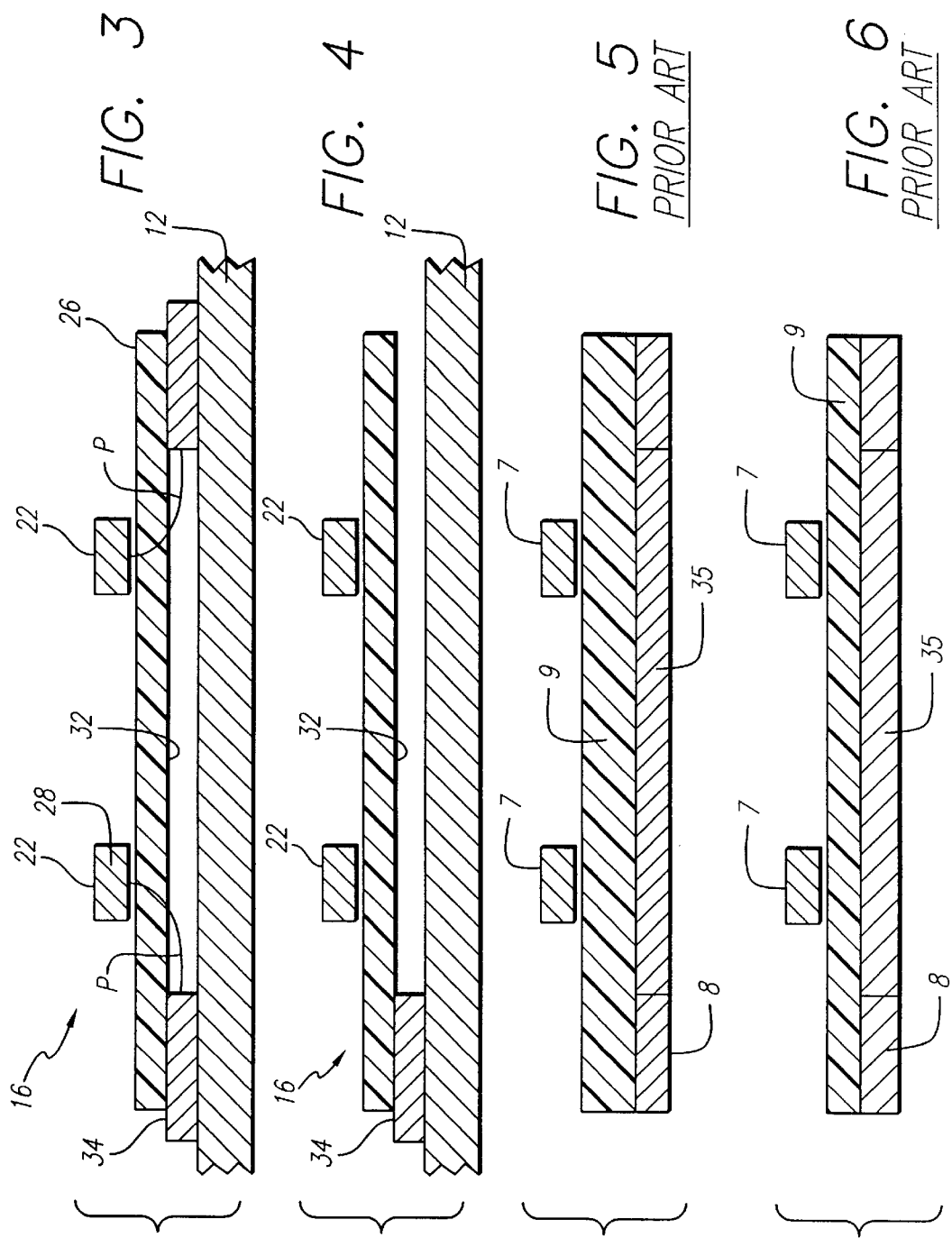

WIRELESS DISK DRIVE SUSPENSION WITH OPTIMIZED MECHANICAL AND ELECTRICAL PROPERTIES

REFERENCE TO RELATED APPLICATION

This application is a continuation of U.S. patent application Ser. No. 09/436,051, filed Nov. 8, 1999, now U.S. Pat. No. 6,295,183 and further claims the benefit of United States Provisional Application, Ser. No. 60/152,145, filed Aug. 31, 1999.

BACKGROUND OF THE INVENTION

1. Field of the Invention

This invention relates to disk drive suspensions and more particularly to such suspensions using wireless conductors to electrically connect the suspension slider with the device electronics. The invention further relates to improvements in wireless suspensions to optimize both mechanical and electrical properties.

2. Related Art

Disk drive suspensions comprise a load beam and a wireless conductor extended thereon in the form of a laminate of trace conductors, a dielectric film layer and a stainless steel support layer arranged to carry a slider having a reading and recording head adjacent a spinning disk.

SUMMARY OF THE INVENTION

Significant mechanical properties of a disk drive suspension include flexibility to better track the undulations of the disk, fatigue, stiffness control, and dimensional predictability under a variety of conditions such as humidity, washing, and thermal mismatch. These mechanical properties are significantly dependent on the dielectric film layer. Too thick a layer is detrimental to these properties. A relatively thicker film has been considered necessary, however, for certain desired electrical properties, for example avoidance of shunt capacitance developing between the conductors and the stainless steel. In FIG. 5 of the drawings, a PRIOR ART view shows trace conductors 7 (about 0.0007 inch thick) atop a stainless steel layer 8 (about 0.0008 to 0.001 inch thick) separated by a relatively thick dielectric film layer 9, about 0.001 inch thick, such as is needed to minimize shunt capacitance between the trace conductors and the stainless steel layer. In the PRIOR ART view in FIG. 6 an alternative arrangement (in which like parts have like numbers) is shown in which the dielectric film layer 9 thickness is reduced to about 0.0005 inch which is desirable for mechanical properties but insufficient to minimize capacitive coupling in the arrangement shown since the dielectric path is too short. Insufficiently thick dielectric film reduces the length of the dielectric path between the trace conductors 7 and the stainless steel layer 8; capacitive coupling results, producing a shunt capacitance that reduces the efficiency of current transmission through the trace conductors at higher frequencies. Increasing the dielectric path by completely removing the stainless steel layer 8 and the dielectric film layer 9 to limit capacitive coupling exposes the delicate traces to damage during typical assembly steps.

In the invention, the dielectric film is retained, but at a minimum thickness, such as 0.0005 inch, and the stainless steel layer is removed, but only immediately beneath the trace conductors. The result is the trace conductors are well supported for assembly operations by both the dielectric film and by the closely adjacent stainless layer, and the dielectric path is maximized.

It is an object, therefore, of the present invention to provide an improved disk drive suspension. It is a further object to provide a disk drive suspension of the wireless type able to efficiently transmit current at high frequencies. Yet another object is to provide a wireless disk drive suspension in which shunt capacitance is minimized through an increase in the dielectric path despite the use of a thin dielectric layer considered better for mechanical properties than electrical properties.

These and other objects of the invention, to become apparent hereinafter, are realized in a wireless disk drive suspension comprising a load beam of stainless steel, a flexure adapted to support a slider at a disk surface, and a set of electrical leads extended over portions of the load beam to the slider, the electrical leads comprising a vertically aligned laminate of electrical conductors, an insulating film of a predetermined thickness for desired mechanical properties in the suspension, and a support layer of stainless steel adapted for attaching the laminate to the load beam, the laminate being vertically registered with the load beam in a stack with the stainless steel load beam and stainless steel laminate support layer abutting, the insulating film thickness defining a dielectric path between the conductors and the stainless steel insufficient to limit capacitive coupling between the conductors and the stainless steel, the stainless steel support layer vertically opposite the conductors only being removed between the conductor and the load beam, the removal increasing the dielectric path length to decrease the capacitive coupling without increasing the predetermined thickness of the insulating film, whereby suspension electrical properties are improved without sacrificing mechanical properties dependent on having no greater than the predetermined thickness in the insulating film.

In this and like embodiments, typically, the conductors comprise copper, the insulating film comprises polyimide, the stainless steel support layer is between 0.0008 and 0.001 inch thick except where removed, and/or the conductors are traces about 0.0007 inch thick.

In a preferred embodiment, the invention provides a wireless disk drive suspension comprising a load beam of stainless steel, a flexure adapted to support a slider at a disk surface, and a set of electrical leads extended over portions of the load beam to the slider, the electrical leads comprising a vertically aligned laminate of copper conductors of about 0.0007 inch thick, an insulating film of a predetermined thickness below about 0.0005 inch having desired mechanical properties in the suspension, and a support layer of stainless steel between about 0.0008 and 0.001 inch thick, the support layer being adapted for attaching the laminate to the load beam, the laminate being vertically registered with the load beam in a stack with the stainless steel load beam and stainless steel laminate support layer abutting, the insulating film thickness defining a dielectric path between the conductors and the stainless steel insufficient to limit capacitive coupling between the conductors and the stainless steel, the stainless steel support layer vertically opposite the conductors only being removed between the conductor and the load beam, the removal increasing the dielectric path length by the thickness of the removed layer to decrease the capacitive coupling without increasing the predetermined thickness of the insulating film, whereby suspension electrical properties are improved without sacrificing mechanical properties dependent on having no greater than the predetermined thickness in the insulating film.

BRIEF DESCRIPTION OF THE DRAWINGS

The invention will be further described in conjunction with the attached drawings, in which:

FIG. 3 is a view taken on line 3—3 in FIG. 2;

FIG. 4 is a view taken on line 4—4 in FIG. 2;
FIG. 5 is a PRIOR ART view; and,
FIG. 6 is further a PRIOR ART view.

DETAILED DESCRIPTION

Figure 1:
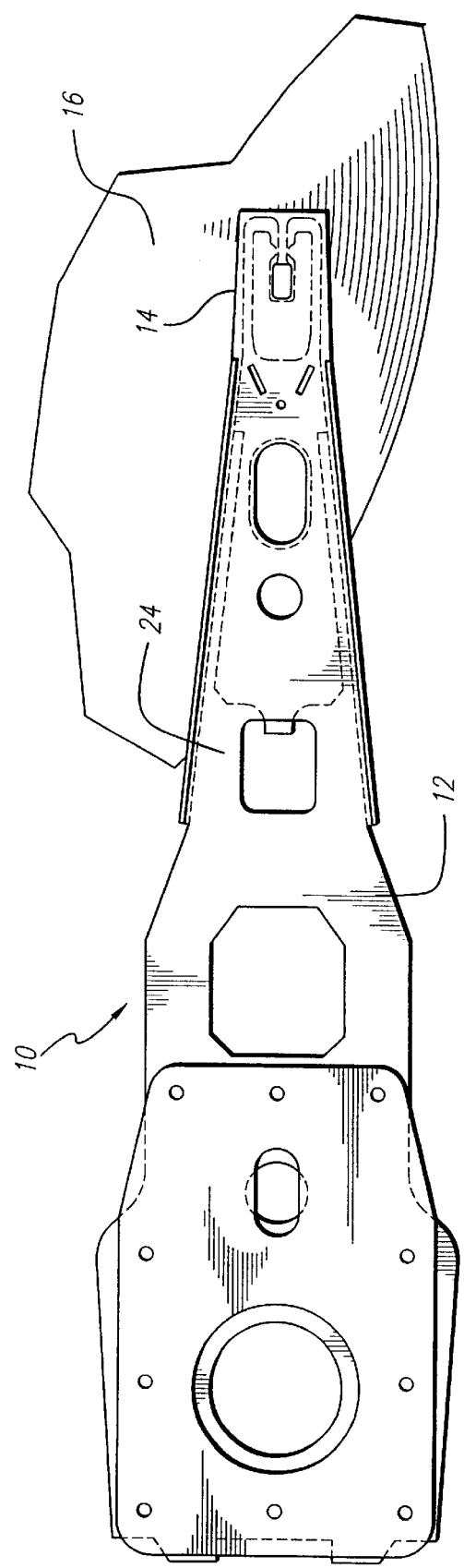
FIG. 1 is a plan view of the wireless suspension according to the invention.
Figure 2:
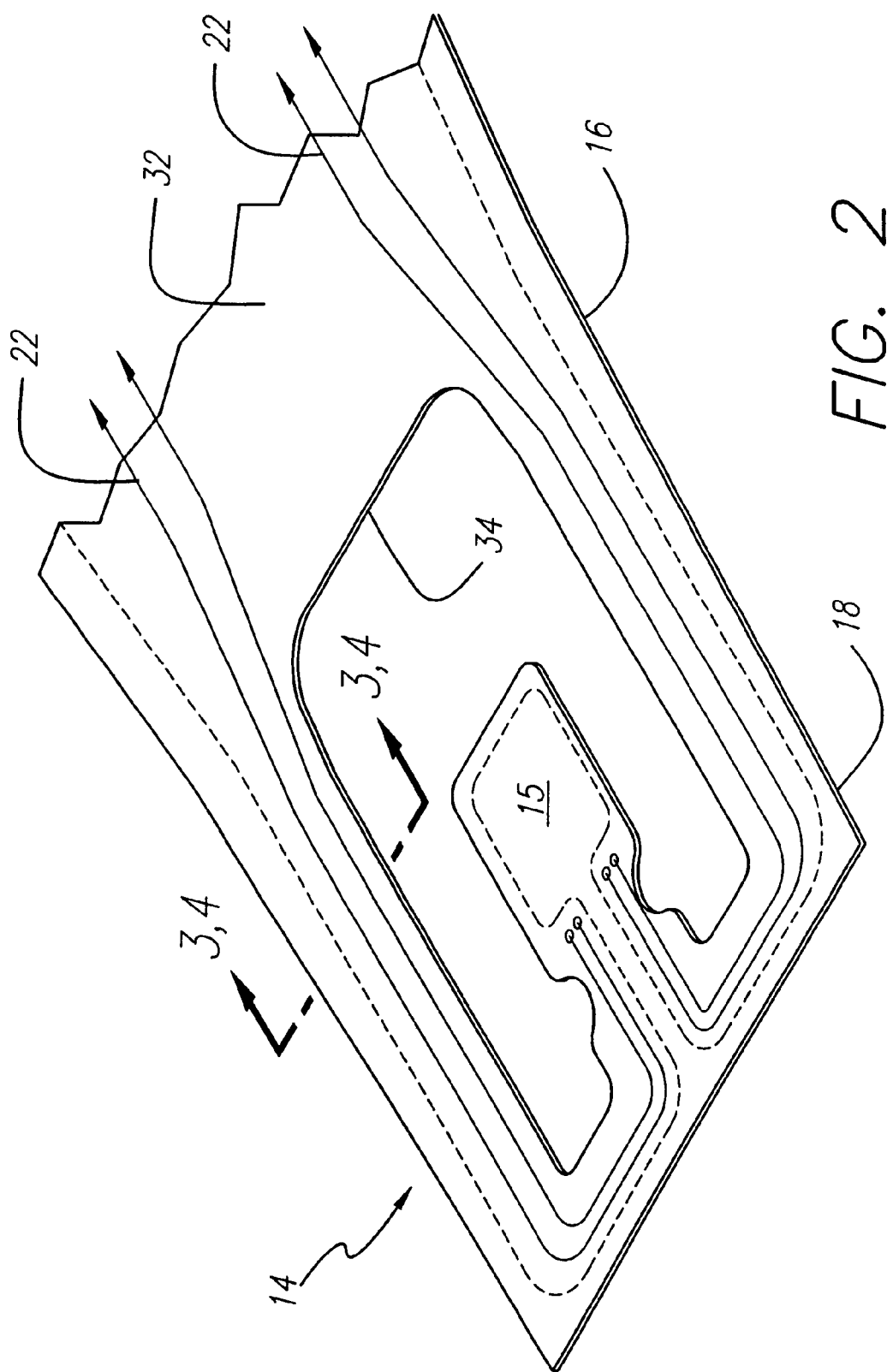
FIG. 2 is an oblique view of the distal end thereof.

Previous designs of wireless suspensions have a laminate of stainless steel (0.0008 to 0.001 inch thick), polyimide (Kapton™) (0.0005 to 0.001 inch thick) and copper ("half-ounce" or 0.0007 inch thick). For mechanical properties of flexibility, dimensional variation under humid or wash conditions, and thermal mismatch, it is desirable to use as thin a layer of polyimide/Kapton as possible. For electrical properties, it is desirable to have the longest dielectric path possible between the conductive copper traces and the stainless steel. This is usually interpreted to mean that the polyimide should not be too thin. If the dielectric path is too small, the traces are capacitively coupled to the stainless steel resulting in a shunt capacitance that reduces the efficiency of current transmission through the traces at higher frequencies.

The invention wireless disk drive suspension is shown at 10 and comprises a load beam 12 of stainless steel, a flexure 14 adapted to support a slider (not shown) on flexure tongue surface 15 adjacent a disk surface (not shown), and a wireless conductor structure 16 defining at its distal end 18 the flexure 14 and including a set of electrical leads 22 extended over portions 24 of the load beam to extend to the slider. The electrical leads 22 surmount a vertically aligned laminate 26 of copper conductors 28 of about 0.0007 inch thick, an insulating film layer 32, preferably a polyimide of a predetermined thickness below about 0.0005 inch and having desired mechanical properties in the suspension. The laminate 26 further includes a support layer 34 of stainless steel between about 0.0008 and 0.001 inch thick. The support layer 34 is adapted for attaching the laminate 26 to the load beam 12. The laminate 26 is vertically registered with the load beam 12 in a stack as shown with the stainless steel load beam and stainless steel laminate support layer 34 facially abutting for wel attachment. The insulating film layer 32 thickness defines a dielectric path P between the conductors 28 and the stainless steel support layer 34 that would be insufficient to limit capacitive coupling between the conductors and the stainless steel layer were the stainless steel layer opposite the conductors. This arrangement is shown in FIGS. 5 and 6 (PRIOR ART). In the invention, only that portion (35 in FIGS. 5 and 6) of the stainless steel support layer 34 vertically opposite the conductors is removed between the conductor 28 and the load beam 12. This removal increases the dielectric path P length by the thickness of the removed layer portion 35 to decrease the capacitive coupling without increasing the predetermined thickness of the insulating film layer 32. The suspension electrical properties are improved without sacrificing mechanical properties dependent on having no greater than the predetermined thickness in the insulating film.

The stainless steel support layer 34 can be removed completely from one side of the laminate, as shown in FIG. 4, or only partially on both sides of the vertical plane that includes the conductors 28, as shown in FIG. 3.

The invention thus provides an improved disk drive suspension of the wireless type able to efficiently transmit current at high frequencies, and in which shunt capacitance is minimized through an increase in the dielectric path despite the use of a thin dielectric layer considered better for mechanical properties than electrical properties.

We claim:

1. Wireless disk drive suspension comprising a load beam of stainless steel, a flexure adapted to support a slider at a disk surface, and a set of electrical leads vertically registered with portions of said load beam and extending to said slider, said electrical leads comprising a vertically aligned laminate of electrical conductors, an insulating film, and a support layer of stainless steel abutting said load beam stainless steel, said insulating film having a predetermined thickness defining a dielectric path between said conductors and said stainless steel insufficient to limit capacitive coupling between said conductors and said load beam stainless steel, said stainless steel support layer being between said conductors and said load beam stainless steel and of a width and placement such that said stainless steel layer is offset from said conductors to Increase said dielectric path length and decrease said capacitive coupling without increasing said predetermined thickness of said insulating film, whereby suspension electrical properties are improved without sacrificing mechanical properties dependent on having no greater than said predetermined thickness In said insulating film.

2. Wireless disk drive suspension according to claim 1, in which said conductors comprise copper.

3. Wireless disk drive suspension according to claim 1, in which said insulating film comprises polyimide.

4. Wireless disk drive suspension according to claim 1, in which said stainless steel support layer is between about 0.0008 and about 0.001 inch thick.

5. Wireless disk drive suspension according to claim 1, in which said conductors are about 0.0007 inch thick.

6. Wireless disk drive suspension according to claim 1, in which said stainless steel support layer is about 0.0005 inch thick except where removed.

7. Wireless disk drive suspension according to claim 6, in which said conductors comprise copper.

8. Wireless disk drive suspension according to claim 7, in which said insulating film comprises polyimide.

9. Wireless disk drive suspension according to claim 8, in which said stainless steel support layer is between about 0.0008 and about 0.001 inch thick.

10. Wireless disk drive suspension according to claim 9, in which said conductors are about 0.0007 inch thick.

11. Wireless disk drive suspension comprising a load beam of stainless steel, a flexure adapted to support a slider at a disk surface, and a set of electrical leads registered with portions of said load beam and extended to said sliders, said electrical leads comprising a vertically aligned laminate of copper conductors of about 0.0007 inch thick, an insulating film of a predetermined thickness of about 0.0005 inch having desired mechanical properties in said suspension, and a support layer of stainless steel between about 0.0008 and about 0.001 inch thick abutting said stainless steel load beam, said support layer being adapted for attaching said laminate to said load beam, said stainless steel support layer being offset from said conductors by being removed between said conductors and said load beam, said support layer offset increasing said dielectric path length to decrease said capacitive coupling without increasing said predetermined thickness of said insulating film, whereby suspension electrical properties are improved without sacrificing mechanical properties dependent on having no greater than said predetermined thickness in said insulating film.

* * * * *